US009646505B2

(12) United States Patent
Ali et al.

(10) Patent No.: US 9,646,505 B2
(45) Date of Patent: May 9, 2017

(54) METHOD OF AUTOMATICALLY CONTROLLING THE DESCENT PHASE OF AN AIRCRAFT USING AIRCRAFT AVIONICS EXECUTING A DESCENT ALGORITHM

(71) Applicant: GE Aviation Systems LLC, Grand Rapids, MI (US)

(72) Inventors: Sherif Fouad Ali, Safety Harbor, FL (US); Mark Lawrence Darnell, Byron Center, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 311 days.

(21) Appl. No.: 14/581,709

(22) Filed: Dec. 23, 2014

(65) Prior Publication Data

US 2017/0011639 A1  Jan. 12, 2017

(51) Int. Cl.
*G05D 1/00* (2006.01)
*G08G 5/02* (2006.01)

(52) U.S. Cl.
CPC .............. *G08G 5/02* (2013.01); *G05D 1/0088* (2013.01)

(58) Field of Classification Search
CPC .................................. G08G 5/02; G05D 1/0088
USPC .................... 701/18, 7, 4, 8; 244/17.13, 182
See application file for complete search history.

(56) References Cited

U.S. PATENT DOCUMENTS

| 4,709,336 | A |   | 11/1987 | Zweifel |
| 5,833,177 | A | * | 11/1998 | Gast ..................... G05D 1/0816 244/175 |
| 6,186,447 | B1 | * | 2/2001 | Virdee ................... B64D 31/08 244/188 |
| 8,170,727 | B2 |   | 5/2012 | Deker |
| 8,352,099 | B1 |   | 1/2013 | Eggold et al. |
| 8,640,989 | B2 |   | 2/2014 | Herrmann |
| 8,666,567 | B2 |   | 3/2014 | Min et al. |
| 8,688,363 | B2 |   | 4/2014 | Svoboda et al. |
| 2006/0284022 | A1 |   | 12/2006 | Harrigan et al. |
| 2011/0046823 | A1 |   | 2/2011 | Ezerzere et al. |
| 2012/0053760 | A1 |   | 3/2012 | Burnside et al. |
| 2016/0031567 | A1 |   | 2/2016 | Roques |

FOREIGN PATENT DOCUMENTS

| EP | 1684145 A1 | 7/2006 |
| EP | 2151730 A1 | 2/2010 |
| GB | 1561650 A | 2/1980 |
| JP | S61163096 A | 7/1986 |
| WO | 2012145608 A1 | 10/2012 |

(Continued)

OTHER PUBLICATIONS

European Search Report and Opinion issued in connection with corresponding EP Application No. 15197006.8 on May 10, 2016.

(Continued)

*Primary Examiner* — Marthe Marc-Coleman
(74) *Attorney, Agent, or Firm* — GE Global Patent Operation; William S. Munnerlyn

(57) ABSTRACT

A method of controlling the flight of an aircraft by automatically controlling the descent phase of an aircraft using a Flight Management System and Flight Guidance System (FMS & FGS) to control the air speed of the air craft and respond to an over speed condition.

20 Claims, 6 Drawing Sheets

(56) References Cited

FOREIGN PATENT DOCUMENTS

WO      2014162092 A1    10/2014

OTHER PUBLICATIONS https://en.wikipedia.org/wiki/Slip_(aerodynamics), retrieved on Dec. 3, 2014, pp. 1-5.
http://www.av8n.com/how/htm/snaps.html#sec-intentional-slip, retrieved on Dec. 3, 2014, pp. 1-20.
U.S. Department of Transportation, Federal Aviation Administration, 2004 Airplane Flying Handbook, issue: FAA-H-8083-3A, pp. 1-281.
Japanese Office action issued in connection with the corresponding JP Application No. 2015-243706 dated Dec. 20, 2016.

\* cited by examiner

METHOD OF AUTOMATICALLY CONTROLLING THE DESCENT PHASE OF AN AIRCRAFT USING AIRCRAFT AVIONICS EXECUTING A DESCENT ALGORITHM

STATEMENT REGARDING FEDERALLY SPONSORED RESEARCH OR DEVELOPMENT

This invention was made with government support under Contract No. DTFAWA-10-C-00046 awarded by the United States Federal Aviation Administration. The Government has certain rights in this invention.

BACKGROUND OF THE INVENTION

The descent of an aircraft from a cruise phase to a landing phase may be controlled for a variety of reasons, which may have contradictory goals. When fuel conservation is the primary goal, it is common to perform an idle descent, where the engine is set at idle, i.e. minimum thrust, and controlling the path of descent using control surfaces. During an idle descent, the aircraft may encounter an over-speed condition, which is currently solved by the pilot deploying speed brakes, generating a great amount of noise, which many passengers do not like. For aircraft without speed brakes, other solutions, typically much less desirable, may be used.

Alternatively, the pilot can apply a pitch input into the aircraft, which change the trajectory and consumes additional fuel and defeating the purpose of the idle descent. Another alternative solution is to utilize one or more of the aircraft avionics, like the Flight Management System and/or Flight Guidance System (FMS & FGS), and leave the engine throttle above idle, at approximately 10% and decrease the throttle when an over-speed condition occurs, which also consumes additional fuel and defeats the purpose of an idle descent.

BRIEF DESCRIPTION OF THE INVENTION

The invention relates to a method of automatically controlling the descent phase of an aircraft using aircraft avionics executing a descent algorithm. The aircraft avionics repeatedly receives aircraft airspeed input and compares said airspeed with a first reference airspeed to determine if an over-speed condition has occurred. If an over-speed condition has occurred, the aircraft enters a slip maneuver.

DETAILED DESCRIPTION OF THE INVENTION

Figure 1:
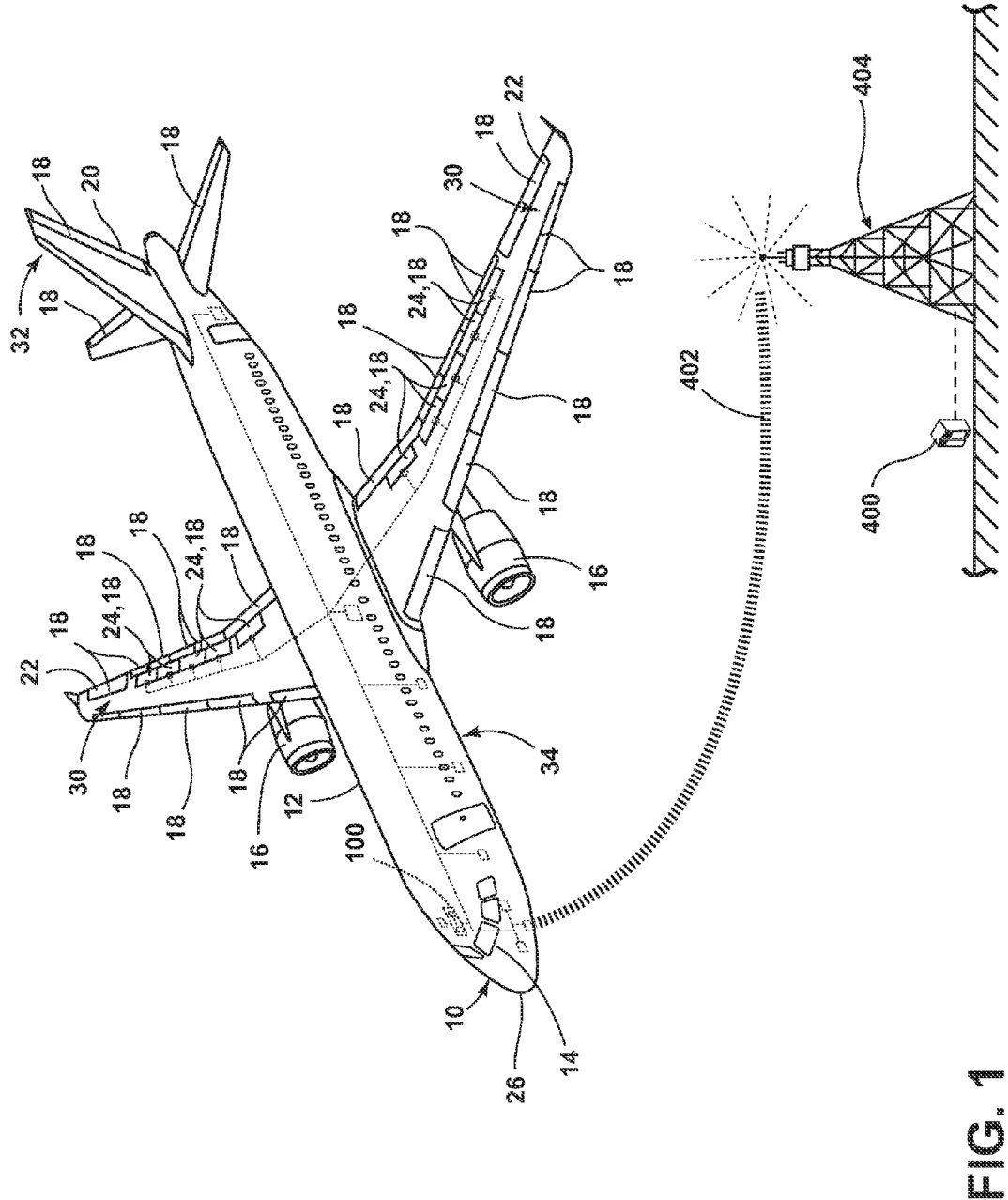
FIG. 1 is a perspective view of the aircraft in data communication with a ground system, and which provide an illustrative environment for embodiments of the invention.

FIG. 1 illustrates an aircraft 10 that may execute embodiments of the invention using aircraft avionics 100, such as a Flight Management System and Flight Guidance System (herein after referred to as "FMS & FGS"). While it is within the scope of the invention for dedicated or specialized aircraft avionics 100 to carry out the different embodiments of the invention, currently practical implementations of the embodiment can use the FMS & FGS currently residing on contemporary aircraft. The FMS & FGS may be programmed to carry out the embodiments of the invention. For purposes of this description the aircraft avionics 100 will be described in the context of the FMS & FGS 100. However, it should be understood that the particular avionics system is not limiting to the invention.

The aircraft 10 may include a fuselage 12, a nose 26, one or more propulsion engines 16 coupled to the fuselage 12, a cockpit 14 positioned in the fuselage 12, and wings 30 extending outward from the fuselage 12. The aircraft 10 may further include control surfaces 18 on the wing 30 and empennage 32. The control surfaces 18 further comprise ailerons 22 which roll the aircraft 10, rudder 20 which turns the aircraft 10 in the yaw direction, engine throttles which can turn the aircraft 10 in the yaw direction if applied asymmetrically, e.g., differential thrust, and speed brakes 24 to slow the airspeed 40 of the aircraft 10. There are many different types of control surfaces and their use may depend on the size, speed, and complexity of the aircraft 10 on which they are to be used.

A ground system 404 may communicate with the aircraft 10 and other devices including an interface device 400 via a wireless communication link 402, which may be any suitable type of communication such as satellite transmission, radio, etc. The ground system 404 may be any type of communicating ground system 404 such as an airline control or flight operations department.

Figure 2:
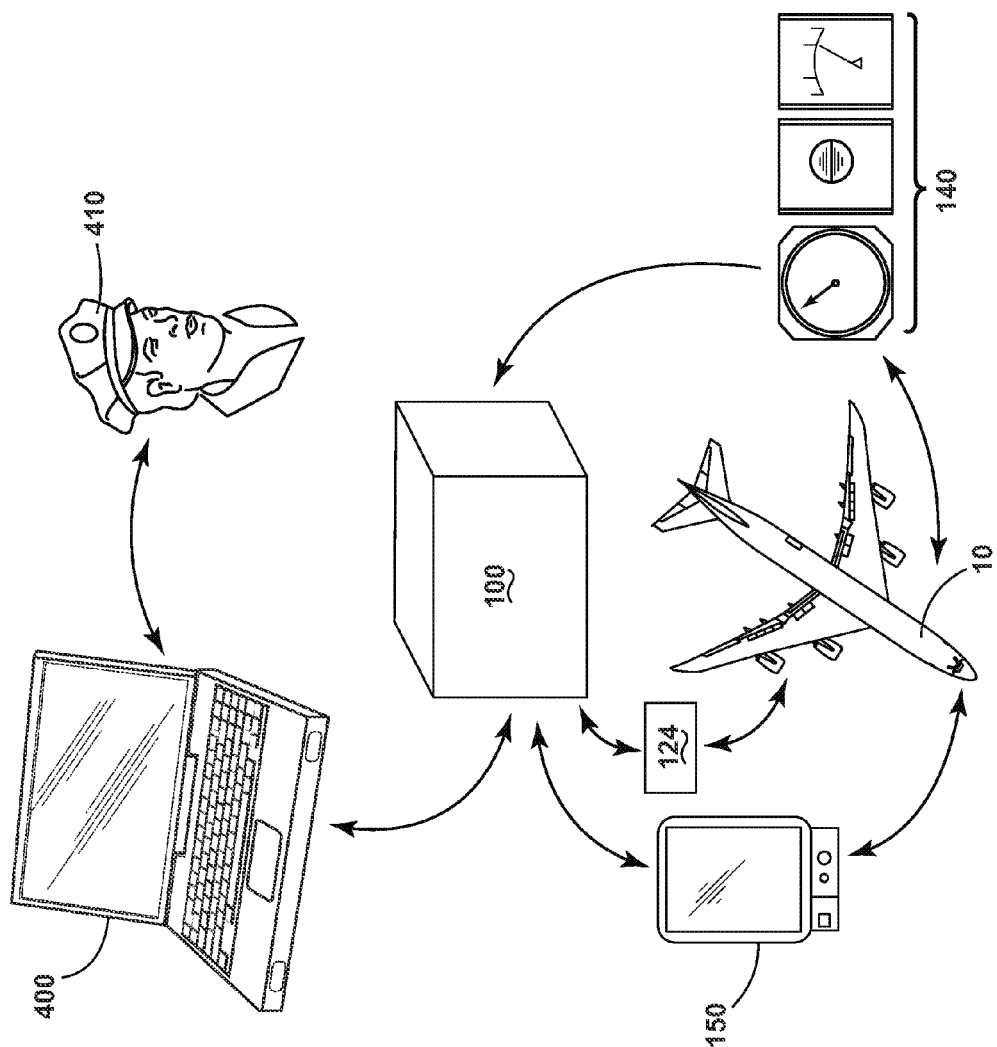
FIG. 2 is a basic illustration of an aircraft avionics systems and its surrounding environment for use in controlling the aircraft.

FIG. 2 schematically illustrates a FMS & FGS 100 with its surrounding environment. The FMS & FGS 100 acquires input from flight instruments 140, avionics 150, and interface device 400 in order to control a flight plan 124 (shown schematically as a box) for an aircraft 10. The flight instruments 140 include, but are not limited to, an altimeter, attitude indicator, airspeed indicator, compass, heading indicator, vertical speed indicator, course deviation indicator, and/or a radio magnetic indicator. The avionics 150 comprise an electronic systems including, but not limited to, communications, navigation, and the display and management of multiple subsystems. The interface device 400 may comprise any visual display which collects input from an operator 410 and presents output to the operator 410 and may comprise a control display unit which incorporates a small screen and keyboard or touchscreen.

The FMS & FGS 100 may be used for any aircraft 10 including commercial or military use with single or multiple engines 16. The aircraft 10 may include but is not limited to a turbine, turbo prop, multi-engine piston, single engine piston and turbofan.

The FMS & FGS have the primary function of in-flight management of a flight plan 124. Using various sensors, such as GPS (global positioning system) and INS (inertial navigation system), to determine a position of the aircraft 10, the FMS & FGS 100 can guide the aircraft 10 along the flight plan 124. The flight plan 124 is generally determined on the ground, before departure either by the pilot or a professional dispatcher. The flight plan 124 is entered into the FMS & FGS 100 either by typing it in, selecting it from a saved library of common routes or via a link with the airline dispatch center. Once in flight, a principal task of the FMS & FGS 100 is to determine the aircraft's position and the accuracy of that position, especially relative to the flight plan. Simple FMS & FGS 100 use a single sensor, generally GPS, in order to determine position.

Figure 3:
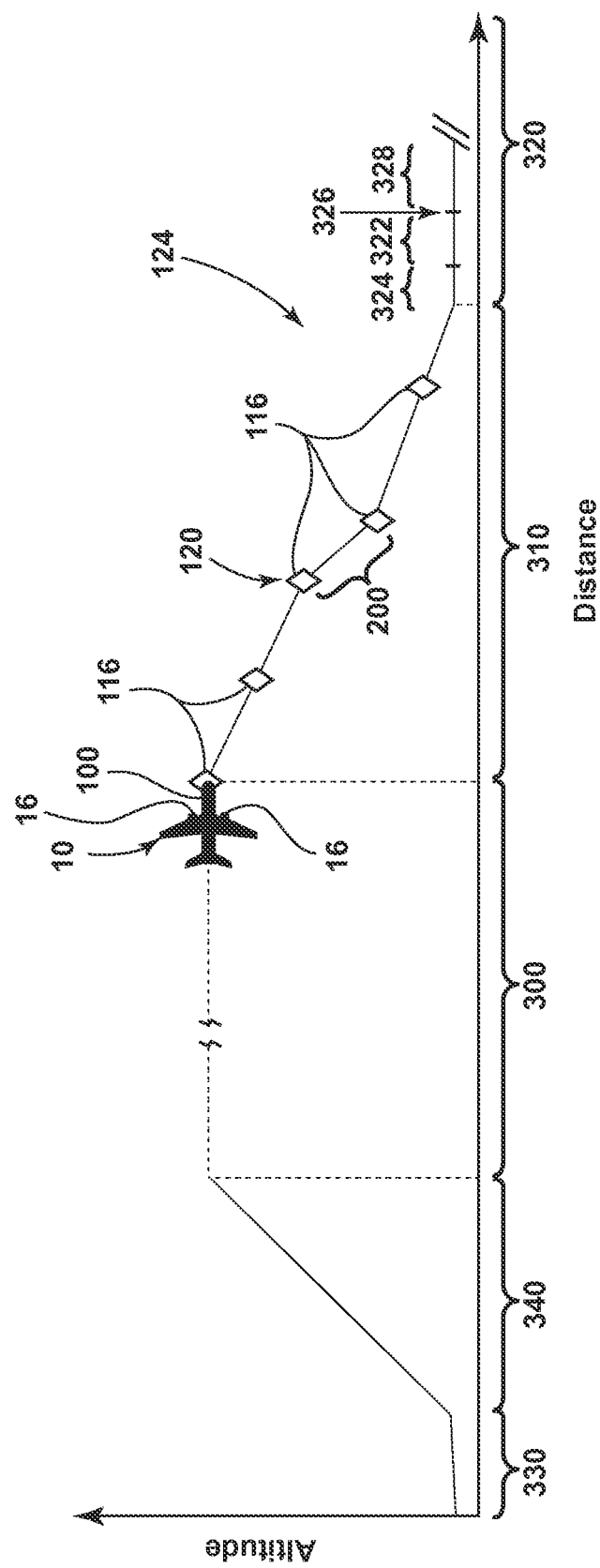
FIG. 3 is an exemplary altitude profile of a flight plan.

FIG. 3 illustrates an exemplary altitude vs distance profile for a flight plan 124 which includes a takeoff phase 330, ascent phase 340, cruise phase 300 typically between 30,000 and 40,000 feet above sea level for contemporary commercial aircraft, then enters a descent phase 310 before a landing phase 320. The descent phase 310 may be any time that the aircraft 10 descends in altitude other than the landing phase 320. In most cases the descent phase 310 is the transition from the cruise phase 300 to the landing phase 320. For purposes of this description, the descent phase 310 does not include the landing phase 320. The landing phase 320 comprises a final approach phase 324, landing flare 322, touchdown 326, and roll-out phase 328.

The landing flare 322 is a maneuver or stage during the landing phase 320 of an aircraft 10 and follows the final approach phase 324 and precedes the touchdown 326 and roll-out phases 328 of landing 310. In the flare 322 the nose 26 of aircraft 10 is raised, slowing the descent rate, and the proper attitude is set for touchdown 326. In the case of conventional landing gear-equipped aircraft 10 the attitude is set to touch down on all three wheels simultaneously or on just the main landing gear 34. In the case of tricycle gear-equipped aircraft 10 the attitude is set to touchdown 326 on the main landing gear 34.

The descent 310 may comprise a normal, rapid, stair-step, continuous, powered, unpowered descent, idle, or nominal thrust, or any combination of the preceding or any other known descent methods. An idle descent may be utilized where the engine 16 is set at idle, i.e. minimum thrust, then descending the aircraft 10 in altitude towards a landing area or ground 54. A nominal thrust descent may also be implemented during the descent phase 310 where the engine 16 is set at approximately 10% thrust above idle. The idle descent or the nominal thrust descent may be part of a continuous approach descent wherein the altitude of the aircraft 10 changes at a steady rate.

In the current market, cost pressures are driving aircraft operators to seek fuel, environmental and maintenance savings. Accordingly, idle descent has become the preferred method during the descent phase 310 as the idle descent provides the most efficient utilization of fuel while reducing noise and increasing the life of the engines 16. A detriment to an idle descent is that at least one degree of freedom of flight control is lost in that the pilot can no longer use thrust to control the rate of descent. The use of thrust increases fuel consumption, which negates the fuel-saving benefit of an idle descent. Unfortunately, during an idle descent, it is common for the aircraft 10 to encounter an airspeed over-speed condition 120. The current solution is to pitch up the aircraft 10 and increase the thrust to slow the airspeed 40 of the aircraft 10, which negates the fuel savings benefits of the idle descent. An embodiment of the invention addresses this over-speed condition 120 by placing the aircraft 10 into a slip maneuver 200, which increases aerodynamic drag to slow the aircraft, instead of using thrust and pitch. The slip maneuver 200 increases the aerodynamic drag of the aircraft 10, which reduces the airspeed 40. Applying the slip maneuver 200 during the descent phase 310 may be accomplished by the FMS & FGS 100 repeatedly obtaining an airspeed input 116 which corresponds to the airspeed 40 of the aircraft 10. When the aircraft 10 encounters an over-speed condition 120 due to gravitational forces, the FMS & FGS 100 will enter the aircraft 10 into a slip maneuver 200 in order to slow the airspeed 40 of the aircraft 10. Once the slip maneuver 200 is completed and the airspeed 16 is reduced as desired, the descent phase 310 continues as before, prior to entering the slip maneuver 200. The slip maneuver 200 can be used to control the airspeed 40 in alternate descents 310 described above.

Figure 4:
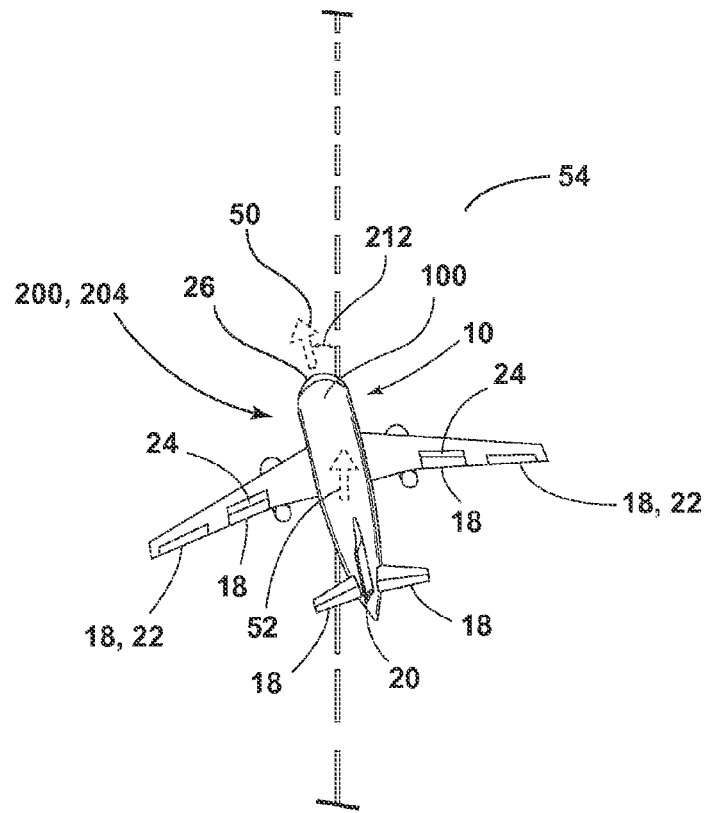
FIG. 4 is a pictorial view of an aircraft in a forward-slip.
Figure 5:
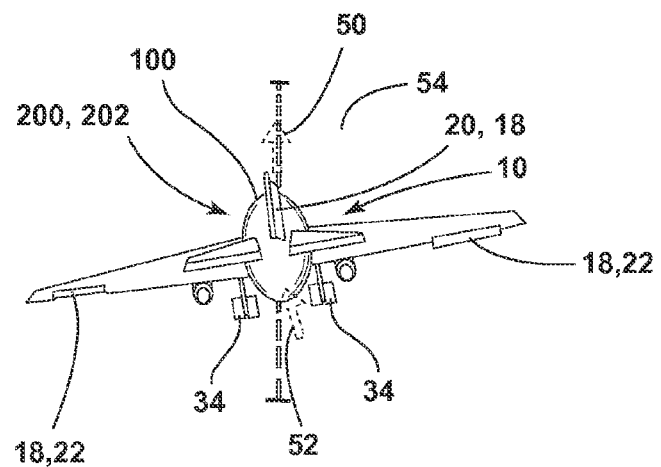
FIG. 5 is a pictorial view of an aircraft in a side-slip.

Referring to FIGS. 4 and 5, specific implementations of the slip maneuver 200 may be at least one side-slip 202 or forward-slip 204 maneuver. Looking first at the forward-slip maneuver 204, the aircraft 10 enters the forward-slip maneuver 204 by the FMS & FGS 100 outputting control surface settings to adjust one or more control surface 18 of the aircraft 10. More specifically, the FMS & FGS will control the aircraft 10 such that the aircraft 10 banks and applies opposing rudder or throttle 20 and aileron 22 in order to keep moving straight along the ground track 52. The nose 26 of the aircraft 10 will point in an alternate direction than the direction of the ground track 52, altered by a slip angle 212. The effect of the slip maneuver 204 is to rotate the aircraft 10 by the slip angle 212, which is a fraction of a degree, in order to increase the aerodynamic drag to decrease the airspeed 40 of the aircraft 10. In one embodiment, the slip angle 212 of the forward-slip maneuver 204 is 0.2-0.3 degree, although the slip angle 212 may be larger or smaller in alternate embodiments.

The slip angle 212 is the angle between the heading 50 and the ground track 52. Heading 50 is the direction which the nose 26 is pointed. Ground track 52 is the path on the surface of the Earth directly below an aircraft 10. In the forward-slip maneuver 204, while the heading 50 of the aircraft changes, the ground track 52 remains the same as before the maneuver.

Referring to FIG. 5, a side-slip maneuver 202 is when the heading 50 of the aircraft 10 remains the same but the ground track 52 changes due to the movement of control surfaces 18, particularly by adjusting rudder or throttle 20 and ailerons 22 in the opposite directions. The horizontal component of lift forces the aircraft 10 to move sideways toward the low wing, creating an angled ground track 52. As the slip angle 212 is a fraction of a degree and the slip maneuver is normally short lived such that the aircraft 10 will not substantially go off the predetermined course. The amount of off track travel can be easily corrected after exiting the slip maneuver 202.

Figure 6:
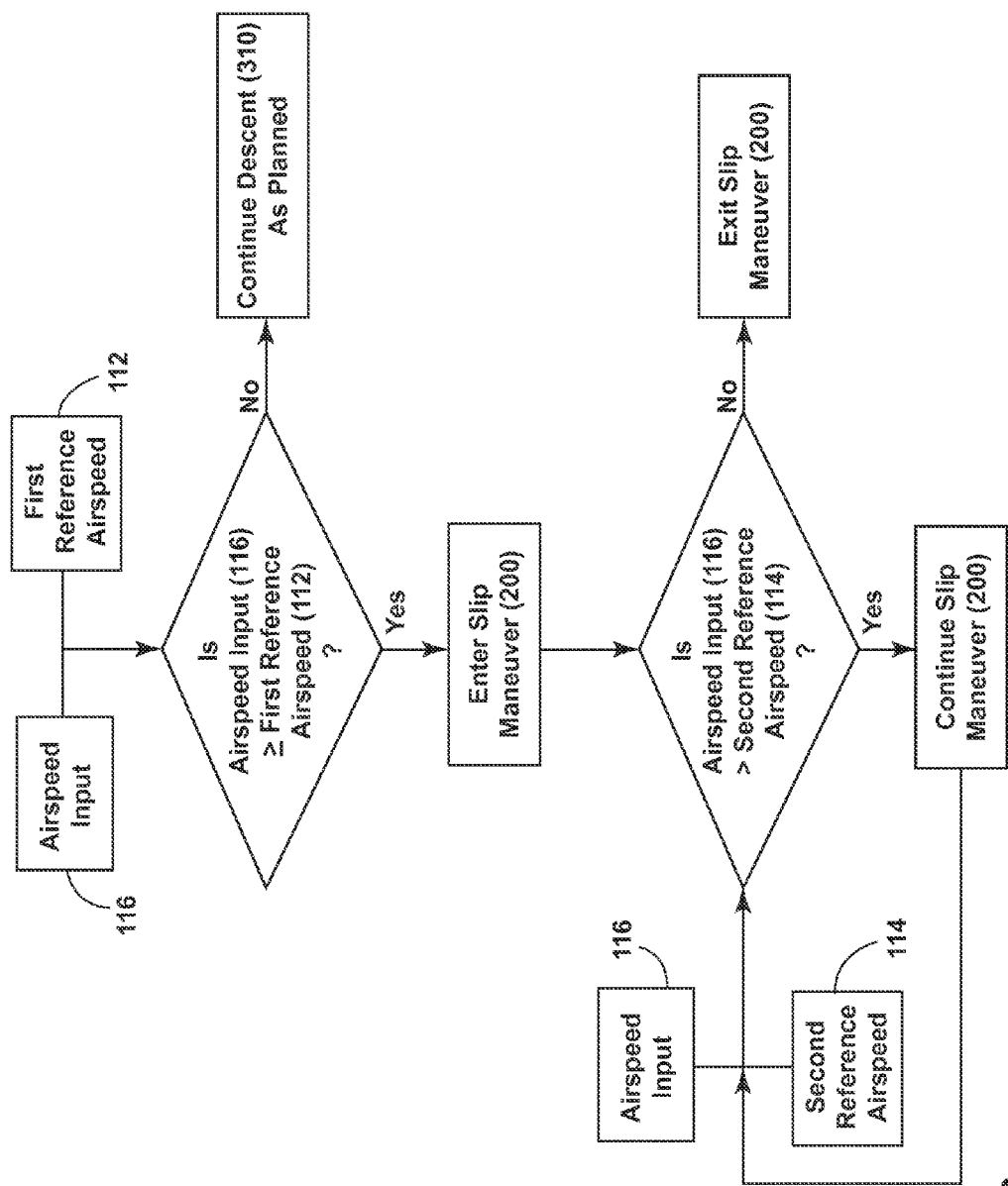
FIG. 6 is a flow chart of an aircraft system for controlling the flight of the aircraft in accordance with an exemplary embodiment.

FIG. 6 illustrates a flow chart of exemplary operation of a specific implementation of the FMS & FGS 100 executing the descent algorithm 110. The airspeed input 116 is repeatedly sent to the FMS & FGS 100 in order to determine if an over-speed condition 120 has occurred. The over-speed condition 120 occurs if the airspeed 40 of the aircraft 10 is greater than or equal to a predetermined first reference airspeed 112. An exemplary first reference air speed 112 is a threshold air speed 118 for the given conditions, i.e. a maximum operating speed limit (Vmo) 122. In this embodiment, the first reference airspeed 112 equals five knots less than the maximum operating speed limit ($V_{mo}$) 122. If the airspeed input 116 is less than the first reference airspeed 112, the descent phase 310 continues as planned without a slip maneuver 200. If the airspeed input 116 is equal to or greater than the first reference airspeed 112, then a slip maneuver 200 is entered. Once the aircraft 10 is in the slip maneuver 200, the airspeed input 116 continues to be repeatedly send to the FMS & FGS 100 and compared to a predetermined second reference airspeed 114. Once the airspeed input 116 is determined to be below the second reference airspeed 114, the aircraft 10 will exit the slip maneuver 200. The second reference airspeed 114 is equal to fifteen knots less than $V_{mo}$ 122 in this embodiment. At that time the descent 310 will continue as before the slip maneuver 200.

The first reference airspeed 112 is greater than the second reference airspeed 114. The range between the first 112 and second reference airspeed 114 is ten knots. In alternate embodiments, the range may be larger, in order to prevent the aircraft from entering and exiting the slip maneuver 200 many times during the descent phase 310. The range may be selected as appropriate for a particular aircraft 10 and its intended operation Inherently after the slip maneuver 200 is exited, the airspeed 40 of the aircraft 10 would naturally increase again, it is contemplated that the aircraft 10 may enter a slip maneuver 200 multiple times.

Figure 7:
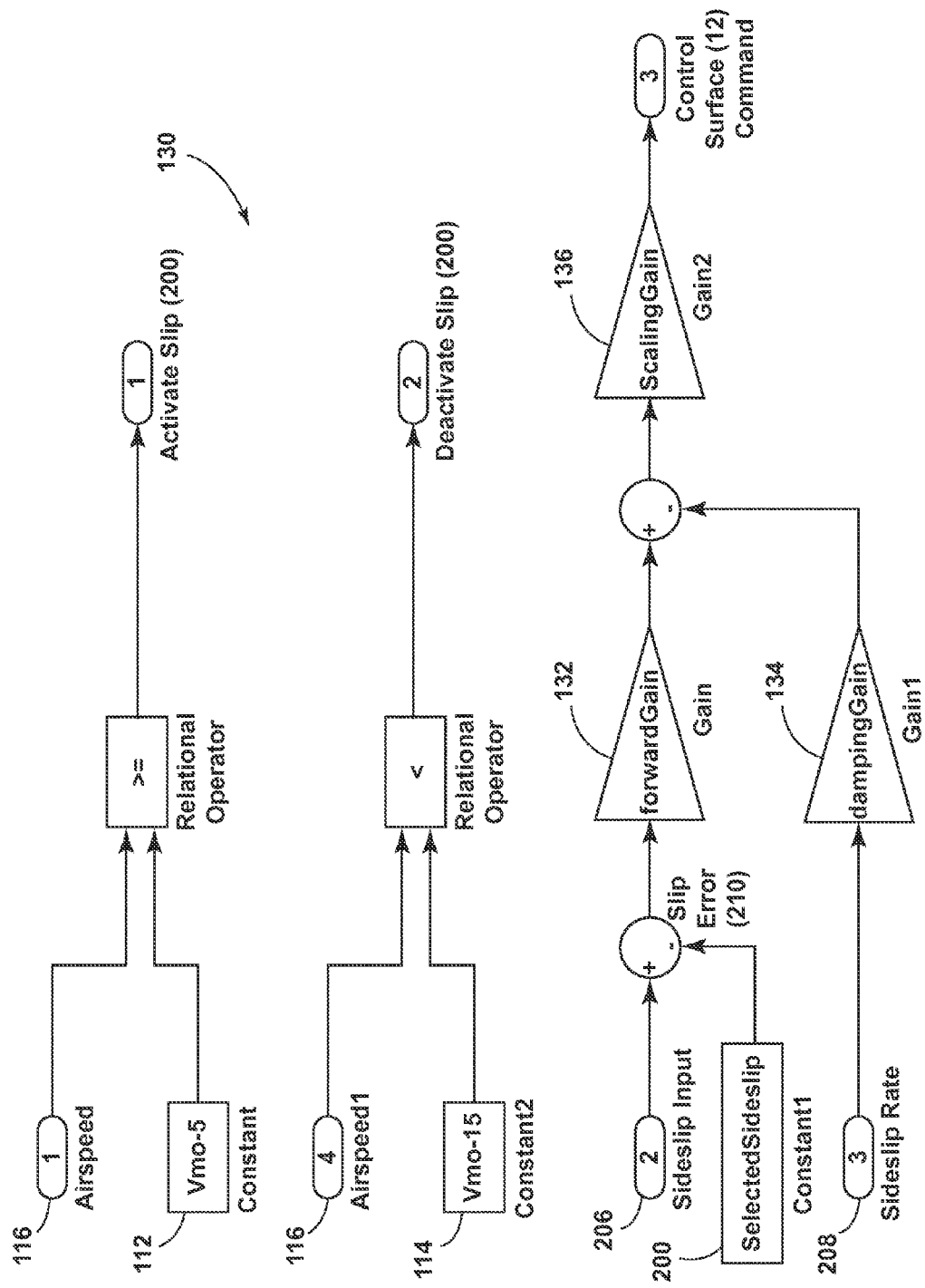
FIG. 7 is a schematic block diagram of a controller to control the flight path of an aircraft according to an exemplary embodiment.

FIG. 7 illustrates an exemplary block diagram of a controller 130 for the FMS & FGS 100. The airspeed input 116 is repeatedly sent to the FMS & FGS 100 and is compared via a relational operator to the first reference air speed 112. If the airspeed input 116 is equal to or greater than the first reference air speed 112, a slip maneuver 200 is activated. When the airspeed input 116 is determined to be less than the second reference air speed 114, the slip maneuver 200 is deactivated. A slip input 206 and slip maneuver 200 is input to the FMS & FGS 100 then a slip error 210 is calculated from a summing point. The slip error 210 determines the forward gain 132 which is summed with a damping gain 134 from the slip rate input 208. The sum of the forward gain 132 and damping gain 134 results in the scaling gain 136 and thus the control surface 18 command is determined. The illustrated exemplary controller 130 is in no way limiting to the invention disclosed.

In any of the previously described embodiments, the slip maneuver may be entered into prior to reaching the over speed condition. The descent algorithm being executed by the FMS & FGS to control the descent may be programmed to monitor the aircraft's speed and at a predetermined value (percentage, threshold, delta, rate of change, etc.) before reaching the operational speed limit, such as Vmo, the FMS & FGS initiates the sending of the appropriate control signals to the appropriate control surfaces, such as rudder or throttle and aileron, to perform the slip maneuver and put the aircraft into the slip condition. The FMS & FGS could also be programmed to project if/when the aircraft is likely to reach an over speed condition based on the acceleration of the aircraft and the current airspeed. In response to this projection, the FMS & FGS can execute the slip maneuver.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of automatically controlling the descent phase of an aircraft using aircraft avionics executing a descent algorithm, the method comprising:

repeatedly receiving as input to the aircraft avionics an airspeed input indicative of the airspeed of the aircraft;

comparing by the aircraft avionics the airspeed input to a first reference airspeed;

determining by the aircraft avionics when airspeed input indicates an over-speed condition based on the comparison; and placing the aircraft into a slip maneuver in response to the determined over-speed condition by the aircraft avionics.

2. The method of claim 1 further comprising exiting the aircraft from the slip maneuver when the over-speed condition ceases.

3. The method of claim 2 further comprising determining the cessation of the over-speed condition by, during the slip maneuver:

repeatedly receiving as input to the flight management an airspeed input indicative of the airspeed of the aircraft;

comparing by the aircraft avionics the airspeed input to a second reference airspeed; and determining by the aircraft avionics when airspeed input indicates an absence of the over-speed condition based on the comparison.

4. The method of claim 3 wherein the first reference air speed is greater than the second reference air speed.

5. The method of claim 4 wherein the first and second reference air speeds differ by at least 10 knots.

6. The method of claim 1 wherein the reference air speed is a threshold speed.

7. The method of claim 6 wherein the threshold speed is a maximum operating speed limit (Vmo).

8. The method of claim 1 wherein the first reference air speed is a speed range.

9. The method of claim 1 wherein the determining of the over-speed condition comprises the airspeed input exceeding the reference airspeed.

10. The method of claim 1 further comprising placing the aircraft into the slip maneuver when the over-speed condition occurs during a minimum thrust condition.

11. The method of claim 1 further comprising placing the aircraft into the slip maneuver when the over-speed condition occurs during an idle descent.

12. The method of claim 1 wherein the slip maneuver comprises at least one of a side-slip maneuver or a forward-slip maneuver.

13. The method of claim 1 wherein placing the aircraft into the slip maneuver comprises the aircraft avionics outputting control surface settings to adjust one or more control surfaces of the aircraft and/or outputting engine throttle control signals.

14. The method of claim 13 wherein the throttle control signals implement a differential thrust from the aircraft engines.

15. The method of claim 13 wherein the control surfaces comprise at least one of a rudder and aileron.

16. The method of claim 15 wherein the output control surface settings provide for opposite rudder and aileron.

17. The method of claim 1 wherein the placing the aircraft into the slip maneuver occurs prior to the aircraft initiating a landing phase.

18. The method of claim 17 further comprising ceasing the slip maneuver prior to the landing phase.

19. The method of claim 18 wherein the landing phase begins prior to a flaring of the aircraft.

20. The method of claim 1 wherein the slip maneuver occurs without the application of a speed brake on the aircraft.

* * * * *